(12) United States Patent
Shaltout et al.

(10) Patent No.: US 11,698,460 B2
(45) Date of Patent: Jul. 11, 2023

(54) ULTRAFAST LASER BEAM STEERING USING FREQUENCY-ARRAYED OPTICS

(71) Applicants: Purdue Research Foundation, West Lafayette, IN (US); THE BOARD OF TRUSTEES OF THE LELAND STANFORD JUNIOR UNIVERSITY, Stanford, CA (US)

(72) Inventors: Amr Mohammad E. A. Shaltout, Stanford, CA (US); Vladimir M. Shalaev, West Lafayette, IN (US); Mark L. Brongersma, Redwood City, CA (US)

(73) Assignees: Purdue Research Foundation, West Lafayette, IN (US); BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 859 days.

(21) Appl. No.: 16/605,902

(22) PCT Filed: Apr. 17, 2018

(86) PCT No.: PCT/US2018/027945
§ 371 (c)(1),
(2) Date: Oct. 17, 2019

(87) PCT Pub. No.: WO2019/018035
PCT Pub. Date: Jan. 24, 2019

(65) Prior Publication Data
US 2020/0081099 A1 Mar. 12, 2020

Related U.S. Application Data

(60) Provisional application No. 62/486,433, filed on Apr. 17, 2017.

(51) Int. Cl.
*G01S 17/89* (2020.01)
*G01S 7/481* (2006.01)

(52) U.S. Cl.
CPC ............ *G01S 17/89* (2013.01); *G01S 7/4814* (2013.01); *G01S 7/4817* (2013.01)

(58) Field of Classification Search
CPC ... G02B 5/1828; G01S 7/4817; G01S 7/4814; G01S 17/89
See application file for complete search history.

(56) References Cited

U.S. PATENT DOCUMENTS 7,830,442 B2 * 11/2010 Griffis .................... G01S 17/89
348/340
9,244,268 B2 1/2016 Long et al.
(Continued)

FOREIGN PATENT DOCUMENTS

WO WO2015187221 12/2015

OTHER PUBLICATIONS

Shaltout (Shaltout, Amr, "Photonic Metasurfaces for Spatiotemporal and Ultrafast Light Control" (2015). Open Access Dissertations. 1145. https://docs.lib.purdue.edu/open_access_dissertations/1145).*

(Continued)

Primary Examiner — Tsion B Owens
(74) Attorney, Agent, or Firm — Piroozi-IP, LLC

(57) ABSTRACT

A laser beam steering system is disclosed. The system includes a laser source which produces a pulsed laser light beam with a frequency comb spectrum, a metasurface configured to i) receive the pulsed laser, ii) generate a diffracted pulsed laser output at different frequencies with a beam at a center frequency normal to the metasurface, and iii) directing light at different frequencies onto different foci at a focal plane, light propagating from the focal plane leads to gen- (Continued)

eration of one or more optical beams that are controlled in space and time.

10 Claims, 15 Drawing Sheets

(56) References Cited

U.S. PATENT DOCUMENTS

| | | | |
|---|---|---|---|
| 9,476,981 | B2 | 10/2016 | Yaacobi et al. |
| 9,964,833 | B2 | 5/2018 | Eldada |
| 10,509,297 | B2 | 12/2019 | Kafaie Shirmanesh et al. |
| 2016/0124285 | A1* | 5/2016 | Lowell .................... H01S 3/005 |
| | | | 359/326 |

OTHER PUBLICATIONS

Sun et al., Large-scale nanophotonic phased array, Nature 493 (7431), 195-199, 2013.
Huang et al., Gate-tunable conducting oxide metasurfaces, Nano letters 16 (9), 2016.

* cited by examiner

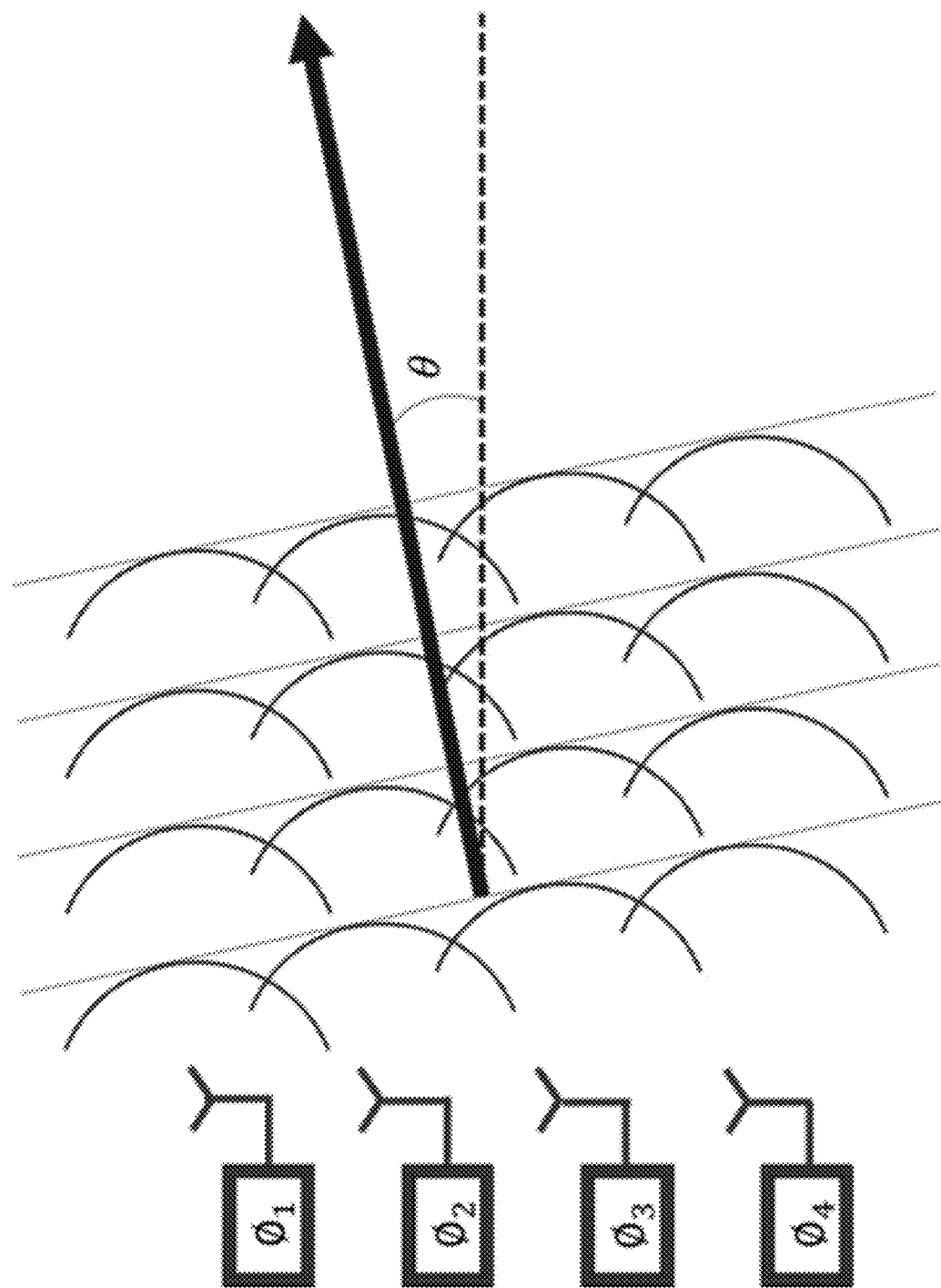
FIG. 1A - Prior Art

ULTRAFAST LASER BEAM STEERING USING FREQUENCY-ARRAYED OPTICS

CROSS-REFERENCE TO RELATED APPLICATIONS

The present patent application is related to and claims the priority benefit of U.S. Provisional Patent Application Ser. No. 62/486,433 filed Apr. 17, 2017 the contents of which is hereby incorporated by reference in its entirety into the present disclosure.

STATEMENT REGARDING GOVERNMENT FUNDING

This invention was made with government support under W911NF-13-1-0226 awarded by the Army Research Office, FA9550-14-1-0389 awarded by the Air Force Office of Scientific Research; and DMR-11209235 awarded by the National Science Foundation. The government has certain rights in the invention.

TECHNICAL FIELD

The present disclosure relates to laser beam steering technology, and more specifically, to production of ultrafast rotating laser beams over nanoseconds or picoseconds time intervals using nanophotonics and ultrafast optical technologies.

BACKGROUND

This section introduces aspects that may help facilitate a better understanding of the disclosure. Accordingly, these statements are to be read in this light and are not to be understood as admissions about what is or is not prior art.

Laser beam steering is a vital technology that is impactful in many areas including, but not limited to, radar applications, imaging, remote sensing, robotics, autonomous vehicles, navigation, geodesy, geomatics, archaeology, mapping, geography, seismology, spaceflights, surveying and atmospheric physics. The steering of the beam can be one-dimensional or multi-dimensional (e.g., when used in a laser show).

The speed of laser steering is critical in many imaging applications, since the frame rate of images is directly dependent on the steering rate.

Conventional beam steering techniques involve rotating or oscillating mirrors to scan the azimuth and elevation, but the scanning speed is limited by the mechanical speed of the elements.

Phase-arrayed optics using liquid crystal modulators, acousto-optic modulators or other electrically tunable technologies have also been used in the art in order to increase the steering speed of the laser.

The best steering time offered by the phased-arrayed optical technologies is in the order of few microseconds. However, shorter steering periods in the order of nanoseconds or picoseconds are desired. In addition, phased-array technology requires building subwavelength modulators as well as having a complicated network of wirings to individually control these modulators which also increases the power consumption in these devices.

There is therefore an unmet need for a new laser steering arrangement that can provide response time in the nanosecond and picosecond range, reduced power consumption, and avoid complex wiring.

SUMMARY

A laser beam steering system is disclosed. The system includes a laser source which produces a pulsed laser light beam with a frequency comb spectrum, a metasurface configured to i) receive the pulsed laser, ii) generate a diffracted pulsed laser output at different frequencies with a beam at a center frequency normal to the metasurface, and iii) directing light at different frequencies onto different foci at a focal plane, light propagating from the focal plane leads to generation of one or more optical beams that are controlled in space and time.

The system further includes a detector that receives back reflected light from an object on which the propagated light is incident and thereby configured to build an image of the object.

In the system, the metasurface includes a metal selected from the group consisting essentially of gold, silver, copper, aluminum, titanium nitride, and zirconium nitride.

In the system, the metasurface includes a dielectric selected from the group consisting essentially of silicon, germanium, alumina, silica, titanium dioxide, and gallium arsenide.

In the system, the metasurface includes an oxide material selected from the group consisting essentially of indium titanium oxide, and aluminum doped zinc oxide.

The system forms a LIDAR system.

In the LIDAR system, the detector includes a streak camera.

In the LIDAR system, the detector includes an on-chip solid-state ultrafast streak camera.

In the system, the laser source includes an on-chip micro-ring frequency-comb generator.

In the system, the beam splitting device, the metasurface, and the detector are constructed on a single chip.

Another laser beam steering system is disclosed. The system includes a laser source which produces a pulsed laser light beam with a frequency comb spectrum, a first metasurface configured to i) receive the pulsed laser and ii) generate a diffracted pulsed laser output at different frequencies with a beam at a center frequency normal to the first metasurface, and a second metasurface configured to i) receive the diffracted pulsed laser output and ii) to focus onto different foci at a focal plane, light propagating from the focal plane leads to generation of one or more optical beams that are controlled in space and time.

The system further includes a detector that receives back reflected light from an object on which the propagated light is incident and thereby configured to build an image of the object.

In the system, the first and second metasurfaces include a metal selected from the group consisting essentially of gold, silver, copper, aluminum, titanium nitride, and zirconium nitride.

In the system, the first and second metasurfaces include a dielectric selected from the group consisting essentially of silicon, germanium, alumina, silica, titanium dioxide, and gallium arsenide.

In the system, the first and second metasurfaces include an oxide material selected from the group consisting essentially of indium titanium oxide, and aluminum doped zinc oxide.

The system forms a LIDAR system.

In the LIDAR system, the detector includes a streak camera.

In the LIDAR system, the detector includes an on-chip solid-state ultrafast streak camera.

In the system, the laser source includes an on-chip microring frequency-comb generator.

In the system, the beam splitting device, the first and second metasurfaces, and the detector are on chip.

Yet another laser beam steering system is disclosed. The system includes a laser source which produces a pulsed laser light beam with a frequency comb spectrum, a metasurface configured to i) receive the pulsed laser and ii) generate a diffracted pulsed laser output at different frequencies with a beam at a center frequency normal to the first metasurface, and a lens configured to i) receive the diffracted pulsed laser output and ii) to focus onto different foci at a focal plane, light propagating from the focal plane leads to generation of one or more optical beams that are controlled in space and time.

The system further includes a detector that receives back reflected light from an object on which the propagated light is incident and thereby configured to build an image of the object.

In the system, the metasurface includes a metal selected from the group consisting essentially of gold, silver, copper, aluminum, titanium nitride, and zirconium nitride.

In the system, the metasurface includes a dielectric selected from the group consisting essentially of silicon, germanium, alumina, silica, titanium dioxide, and gallium arsenide.

In the system, the metasurface includes an oxide material selected from the group consisting essentially of indium titanium oxide, and aluminum doped zinc oxide.

The system forms a LIDAR system.

In the LIDAR system, the detector includes a streak camera.

In the LIDAR system, the detector includes an on-chip solid-state ultrafast streak camera.

In the system, the laser source includes an on-chip microring frequency-comb generator.

In the system, the beam splitting device, the metasurface, and the detector are on chip.

Yet another laser beam steering system is disclosed. The system includes a laser source which produces a pulsed laser light beam with a frequency comb spectrum, a diffraction grating configured to i) receive the pulsed laser and ii) generate a diffracted pulsed laser output at different frequencies with a beam at a center frequency normal to the first metasurface, and a metasurface configured to i) receive the diffracted pulsed laser output and ii) to focus onto different foci at a focal plane, light propagating from the focal plane leads to generation of one or more optical beams that are controlled in space and time.

The system further comprising a detector that receives back reflected light from an object on which the propagated light is incident and thereby configured to build an image of the object.

In the system, the metasurface includes a metal selected from the group consisting essentially of gold, silver, copper, aluminum, titanium nitride, and zirconium nitride.

In the system, the metasurface includes a dielectric selected from the group consisting essentially of silicon, germanium, alumina, silica, titanium dioxide, and gallium arsenide.

In the system, the metasurface includes an oxide material selected from the group consisting essentially of indium titanium oxide, and aluminum doped zinc oxide.

The system forms a LIDAR system.

In the system, the detector includes a streak camera.

In the system, the detector includes an on-chip solid-state ultrafast streak camera.

In the system, the laser source includes an on-chip microring frequency-comb generator.

In the system, the beam splitting device, the metasurface, and the detector are on chip.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 1A shows a diagram illustrating the concept of a phased-array source wherein each element of the array has a phase-shift with respect to adjacent elements, according to the prior art.

FIG. 8A shows the structural dimension of a single nano-antenna and where an array of such nano-antennas whose orientations are locally controlled (FIG. 8B) can be designed to implement the function of two devices together (diffraction grating and lens) to make the operation shown in FIG. 7B.

DETAILED DESCRIPTION

Figure 1B:
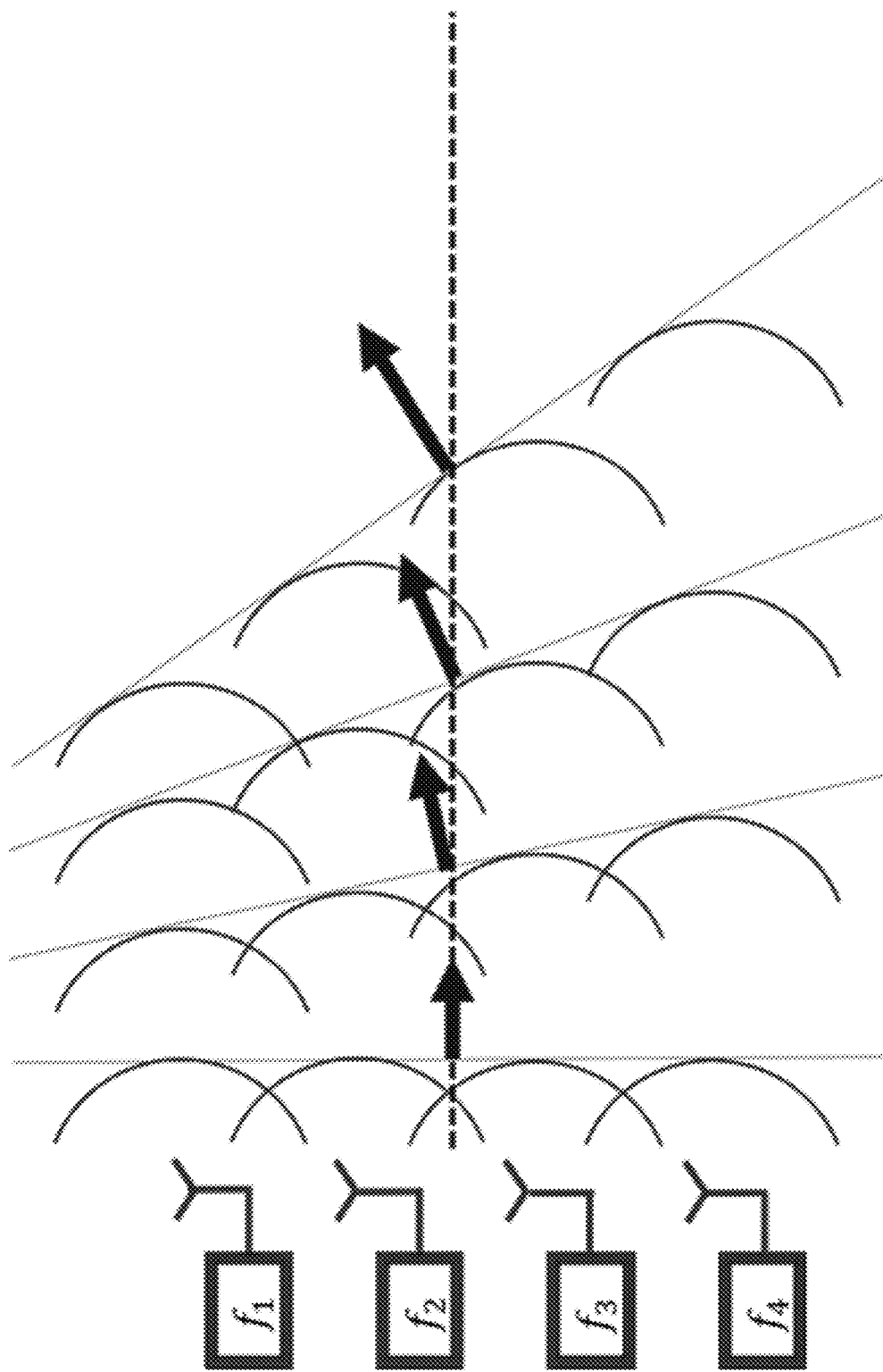
FIG. 1B shows a diagram illustrating the concept of a frequency-arrayed source where each element of the array has a frequency shift with respect to adjacent elements, according to the present disclosure.

For the purposes of promoting an understanding of the principles of the present disclosure, reference will now be made to the embodiment illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Prior art beam steering technologies depend on phase-arrayed structures which is conceptually demonstrated in FIG. 1A. In this arrangement, light waves emitted from different sources interfere together to generate an optical beam at a specific angle. The angle of the beam is perpendicular the phase-front of the waves (the plane where all the sources have the same phase). Because of the relative phase-shift between sources the phase-front is tilted in general. In order to steer the angle of the beam, the phase of each element of the phased-array needs to be modulated, and therefore, the beam steering speed is dependent on the speed of the phase-modulating technology. Such technologies are generally not adequate to modulate at speed that can offer response time in the nanosecond and picosecond range.

The present disclosure provides a novel frequency-arrayed structure which is demonstrated in FIG. 1B, according to one embodiment. The distance between phase-fronts is different for different array elements due to different frequencies/wavelengths. This causes the phase-fronts direction to change with time. As a consequence, the direction of light beam changes spontaneously without the need of external modulation, and the steering speed is dependent on the frequency difference and spatial separation between the array elements.

Figure 2:
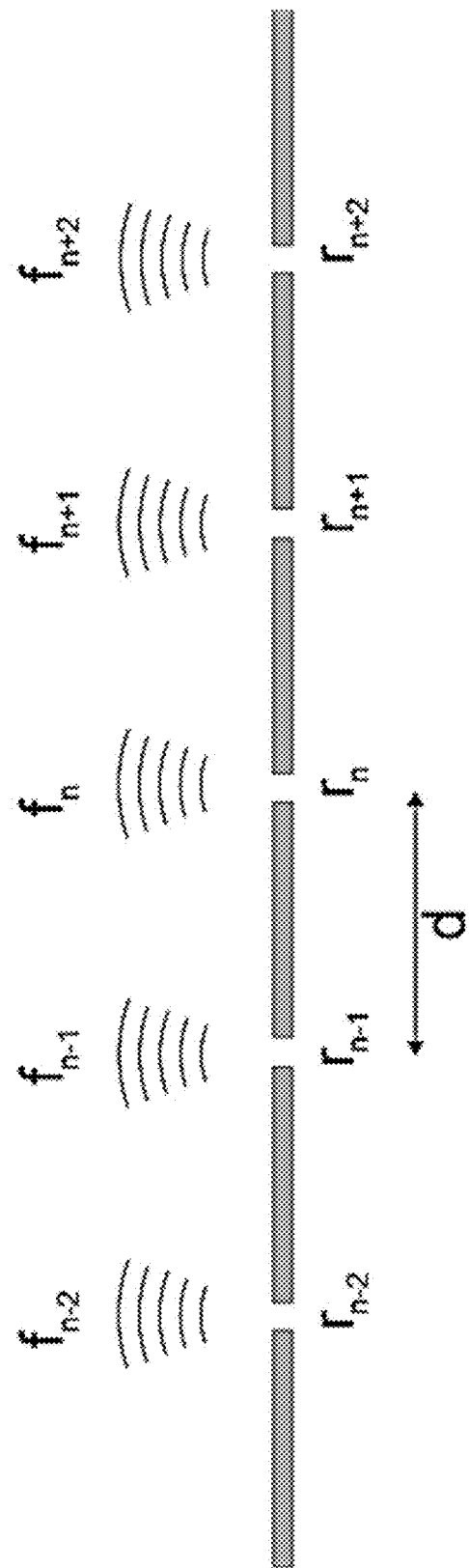
FIG. 2 shows a diagram illustrating a phase-locked array of cylindrical waves emanating from a plurality of sources, with "d" denoting the distance between two such sources, according to the present disclosure.
Figure 3:
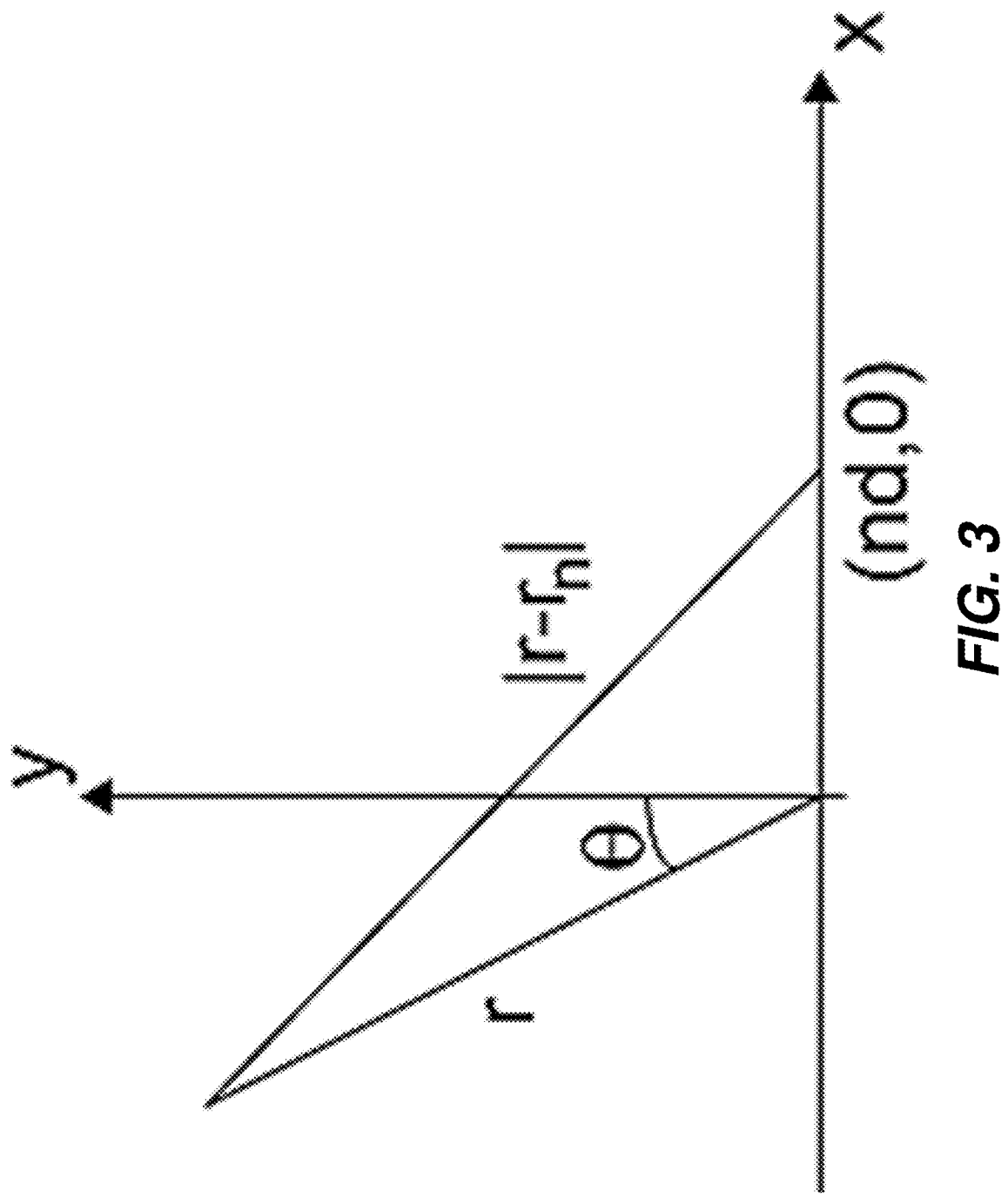
FIG. 3 shows a coordinate system used in mathematical formulations, according to the present disclosure.

According to the present disclosure, a linear array of frequency combs (which is a set of phase-locked sources of different frequencies) is used, wherein each of the frequency combs acts as a cylindrical source of waves generated from an array of sources as shown in FIG. 2. These sources are placed at discrete locations with d separation, wherein each two consecutive sources have a change in frequency $\Delta f$ where $\Delta f = f_{n+1} - f_n$. The coordinate system used in the mathematical formulation is shown in FIG. 3. The far field generated from this array takes the form:

$$E = \sum_{n=-N}^{N} \frac{e^{i(\omega_n t - k_n |r - r_n|)}}{\sqrt{|r - r_n|}} \qquad (1)$$

where $r_n = (x_n, y_n) = (nd, 0)$ is the coordinate location of the $n^{th}$ source (shown in FIG. 3),
$\omega_n = \omega_o + \Delta\omega$ is the angular frequency of the $n^{th}$ source, $$k_n = \frac{\omega_n}{c} = k_o + \Delta k$$

is the wavenumber of the $n^{th}$ source,
$\omega_o$ is the angular frequency of the central source,
$k_o$ is the wavenumber of the central source,
$\Delta\omega$ is the change in angular frequency, and
$\Delta k$ is the change in wavenumbers between two consecutive sources.

Using the following approximations:
$\Delta f \ll f_o$,
$\Delta\omega \ll \omega_o$,
$\Delta k \ll k_o$, and
$Nd \ll r$, and by substituting $|r - r_n| = \sqrt{(r\sin\theta + nd)^2 + r^2\cos^2\theta} \approx r + nd \sin\theta$, we obtain $$E \approx \frac{1}{\sqrt{r}} \sum_{n=-N}^{N} e^{i(\omega_n t - k_n(r + nd\sin\theta))} \approx \frac{e^{i(\omega_o t - k_o r)}}{\sqrt{r}} \sum_{n=-N}^{N} e^{in(\Delta\omega t - \Delta k r - k_o d \sin\theta)}$$

The summation on the right-hand side is a known summation in discrete signal processing.
Let $\Omega = \Delta\omega t - \Delta k r - k_o d \sin\theta$ and using $$\sum_{n=-N}^{N} e^{in\Omega} = \frac{\sin\left(\frac{2N+1}{2}\Omega\right)}{\sin\left(\frac{\Omega}{2}\right)}$$

We obtain:

$$E \approx \frac{e^{i(\omega_o t - k_o r)}}{\sqrt{r}} \frac{\sin\left(\frac{2N+1}{2}\Omega\right)}{\sin\left(\frac{\Omega}{2}\right)} \qquad (2)$$

This function has a maximum at $\Omega = 0$ and at integer multiples of $2\pi$ ($\Omega = 2\pi m$). Now it can be shown that the value at which the summation is maximized corresponds to a rotating beam, and the $\Omega$ period of $2\pi$ corresponds to a beam steering repetition time of $1/\Delta f$.

$$\Omega = 0 \text{ leads to } \Delta\omega t - \Delta k r - k_o d \sin\theta = 0 \Rightarrow \sin\theta = \left(\frac{\Delta\omega}{k_o d}\right)t - \left(\frac{\Delta k r}{k_o d}\right).$$

The previous equation demonstrates the beam steering action through the time-variation of $\sin\theta$ with respect to t. The term $(\Delta k r / k_o d)$ is due to the time delay between the source and the distance of measurement r. We can always define the time frame such that $\sin\theta = 0$ at $t = 0$ by substituting $$t \equiv t - \frac{r}{c}.$$

Therefore, we can modify it as follows:

$$\sin\theta = \left(\frac{\Delta\omega}{k_o d}\right)t \qquad (3)$$

The value of center wavelength $\lambda_0$ can be designed to take any value in the visible, infra-red, or THz regime (i.e, any value from 0.3-300 μm). The separation between separate sources is d in the order $(0.1 1)\lambda_0$, ideally in the order of $0.5\lambda_0$. The frequency difference between adjacent sources can have a wide range of variability ranging from few MHz to hundreds of GHz.

Figure 4:
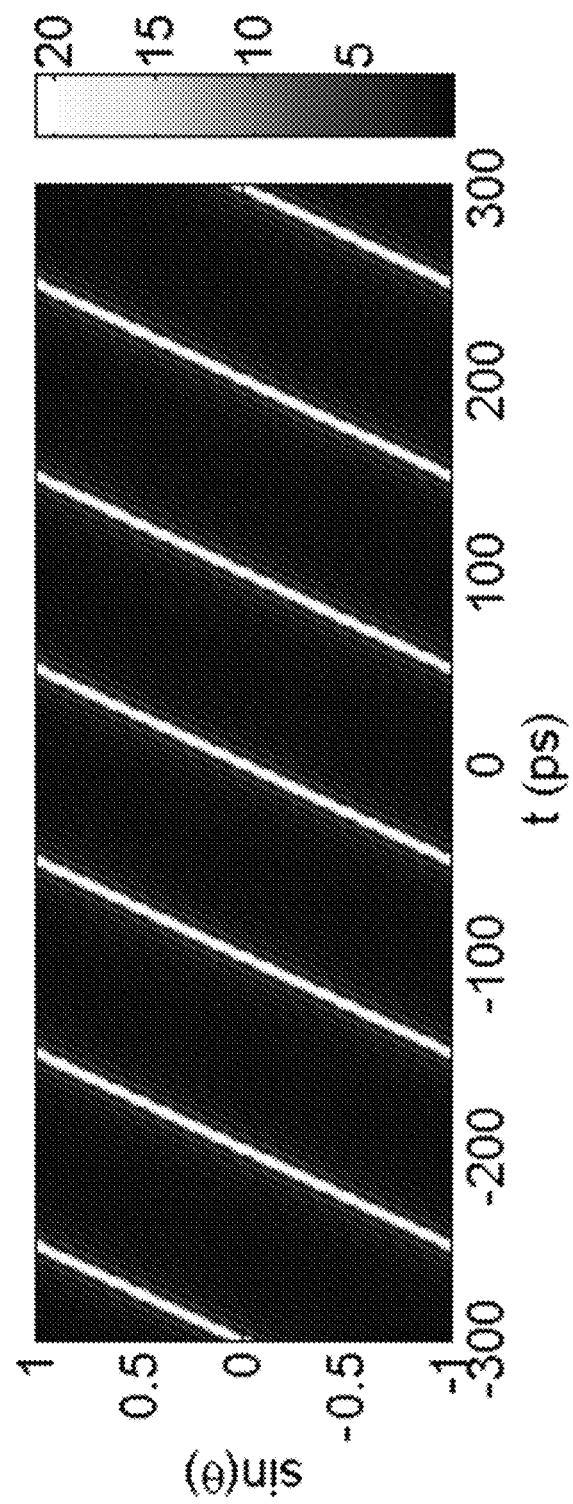
FIG. 4 shows a plot of light intensity with respect to angle and time (sine, vs. t) demonstrating the beam steering effect, according to the present disclosure.

FIG. 4 shows a specific plot of the intensity $I = |E|^2$ with respect $\sin\theta$ and t, where E is calculated according to eq (2).

This plot explains the beam steering effect, and also demonstrates important periodicity patterns in time. In the illustrated diagram, $\lambda_0=1.5$ μm, d=750 nm, $\Delta f=10$ GHz, with 41 frequency comb lines (2N+1=41) in (1).

The periodicity of $2\pi$ with respect to $\Omega$ imposes a temporal periodicity $\tau$ where:

$$\Delta\omega\tau=2\pi$$

and hence, $$\tau = \frac{2\pi}{\Delta\omega} = \frac{1}{\Delta f} \quad (4)$$

The equation shown in (4) implies that the period of the beam steering is the inverse of the frequency separation between the sources.

Also, the period of $2\pi$ in $\Omega$ may cause multiple values of 0 corresponding to multiple beams. We can guarantee that we have a single beam if only a single value of sin θ lies in the interval [−1,1]. This requires:

$$2k_o d < 2\pi \quad (5)$$
$$d < \frac{\lambda_o}{2}$$

Inequality (5) implies that to have a single beam, we need the separation between sources not to exceed half the wavelength of the central source.

Figure 5:
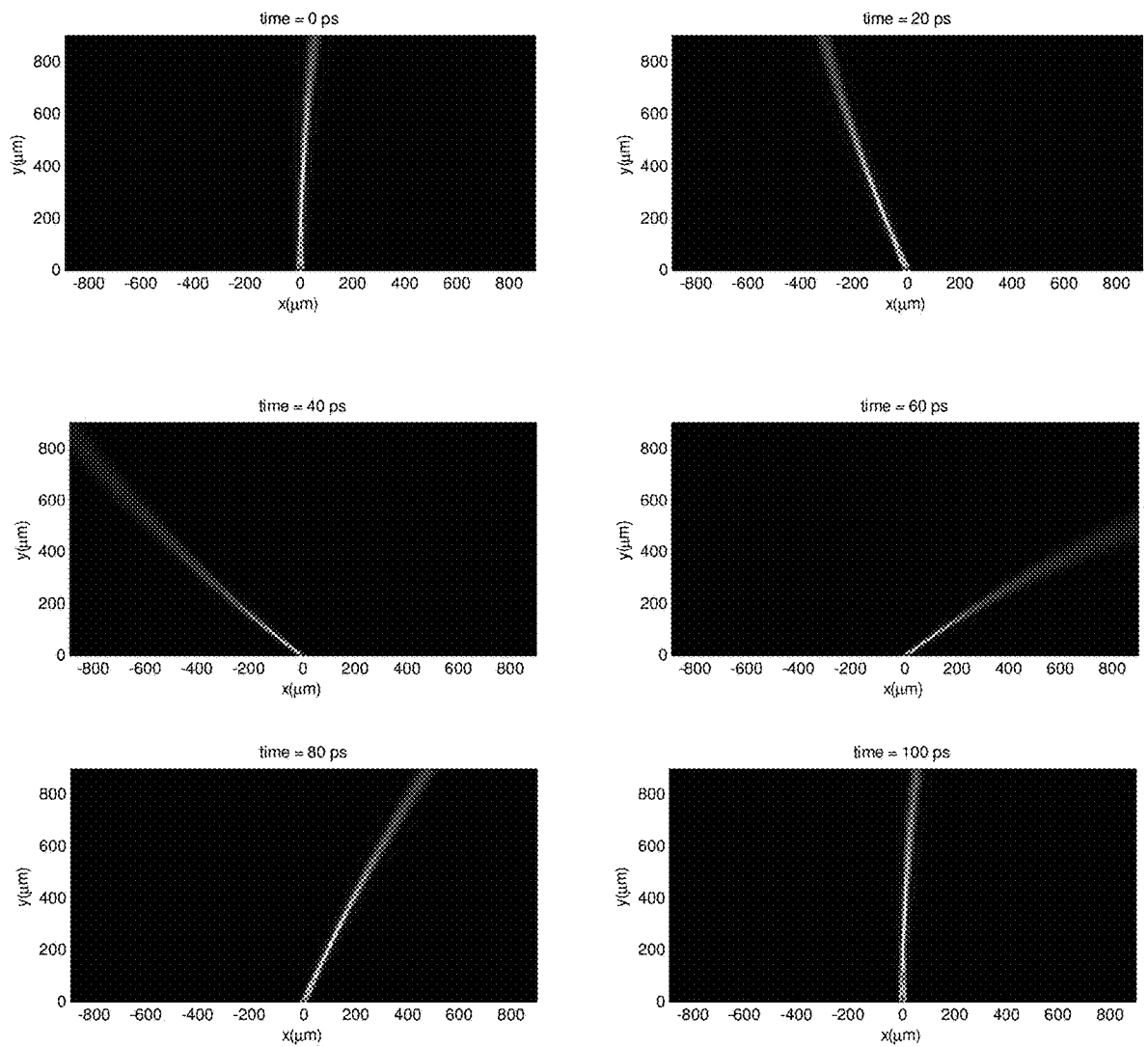
FIG. 5 shows simulation results for beam steering with $d=\lambda_0/2$, wherein "d" is the distance between two sources an exemplary version of which is shown in FIG. 2, according to the present disclosure.

FIG. 5 represents simulation results of light intensity at various time instants calculated according to (1). Beam steering action is obtained from a frequency-arrayed sources of 41 elements. We have substituted $\lambda_0=1.5$ μm, d=750 nm, $\Delta f=10$ GHz, and used 41 frequency comb lines (2N+1=41). The period of steering is 100 ps in accordance with (4). Laser scans all the angles. (i.e. angle of view=180°)

In order to implement the device, an ultrashort laser source is used which can provide the phase-locked spectral components of a frequency comb.

Figure 6A:
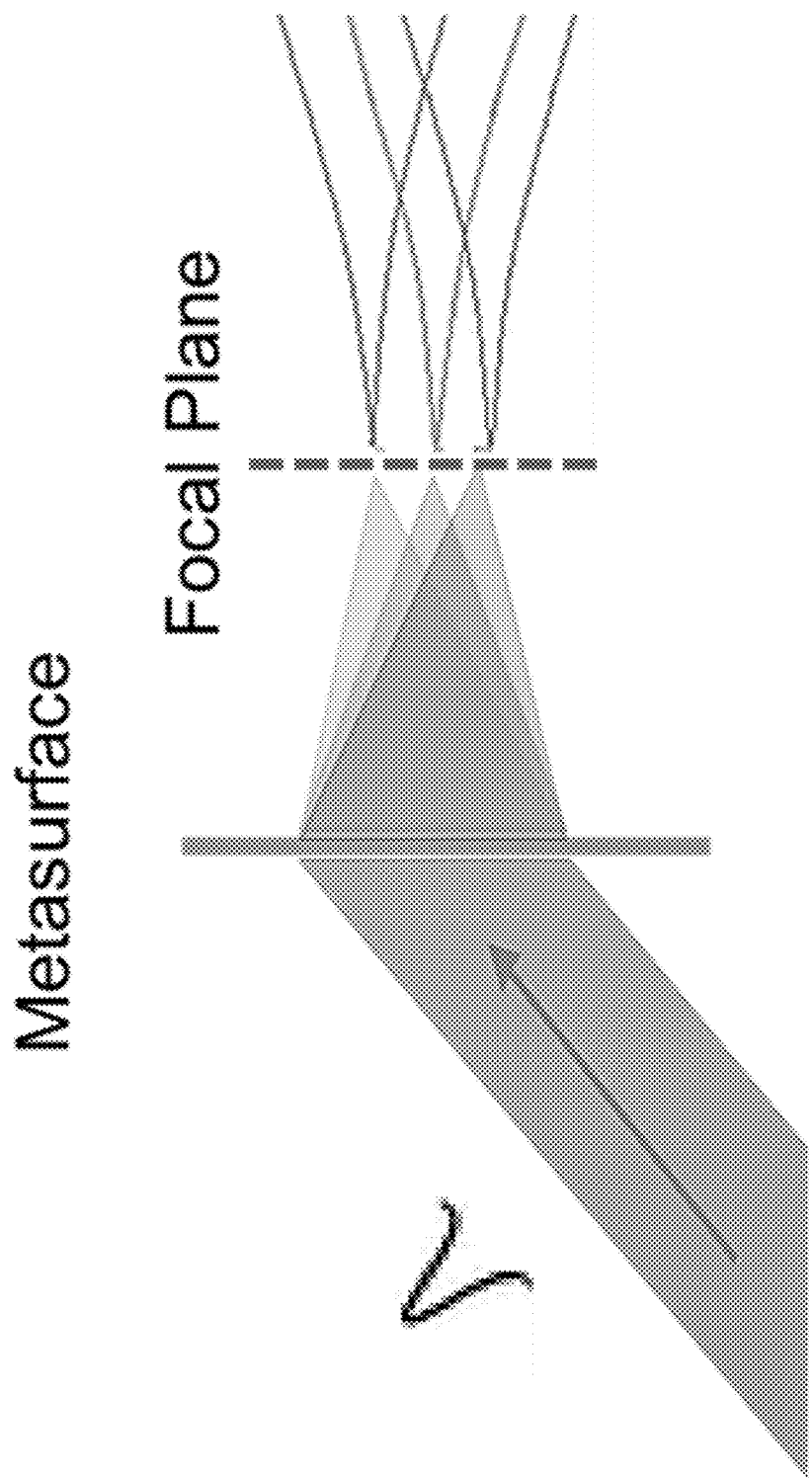
FIGS. 6A and 6B show implementations of a beam steering arrangement where an incident ultrashort pulse is spectrally resolved using a metasurface which is used to focus spectral components to an array of focal spots on a focal place that operate as a secondary source of multi-frequency optical waves.

Different implementations are within the scope of the present disclosure. These implementations include any combination of 1) a conventional diffraction grating generating diffracted beams; 2) a lens for receiving diffracted beams and focusing same onto a focal plane; 3) a metasurface that configured to provide the grating function; and 4) a metasurface that is configured to provide the lens function. In one embodiment of the present disclosure, the two metasurface of options (3) and (4), above, use the same metasurface. Referring to FIG. 6A, an exemplary implementation of a beam steering arrangement according to the present disclosure is provided where an incident ultrashort pulse is spectrally resolved using a metasurface which directly focus spectral components to a focal plane that operate as a secondary source of multi-frequency optical waves. As shown in FIG. 6A, the ultrashort laser pulses are applied to a metasurface to resolve the spectral components and focus them to different foci on a specific focal plane. The grating may comprise a transmission grating or reflection grating. A focusing lens (or focusing mirror) is then used to focus the different spectral components of the frequency comb on a linear array at the focal plane. According to the theory of frequency-arrayed source described earlier, the interference of the waves coming out of the focal plane will add up together to provide the rotating laser beam as shown in FIG. 6B.

Figure 6B:
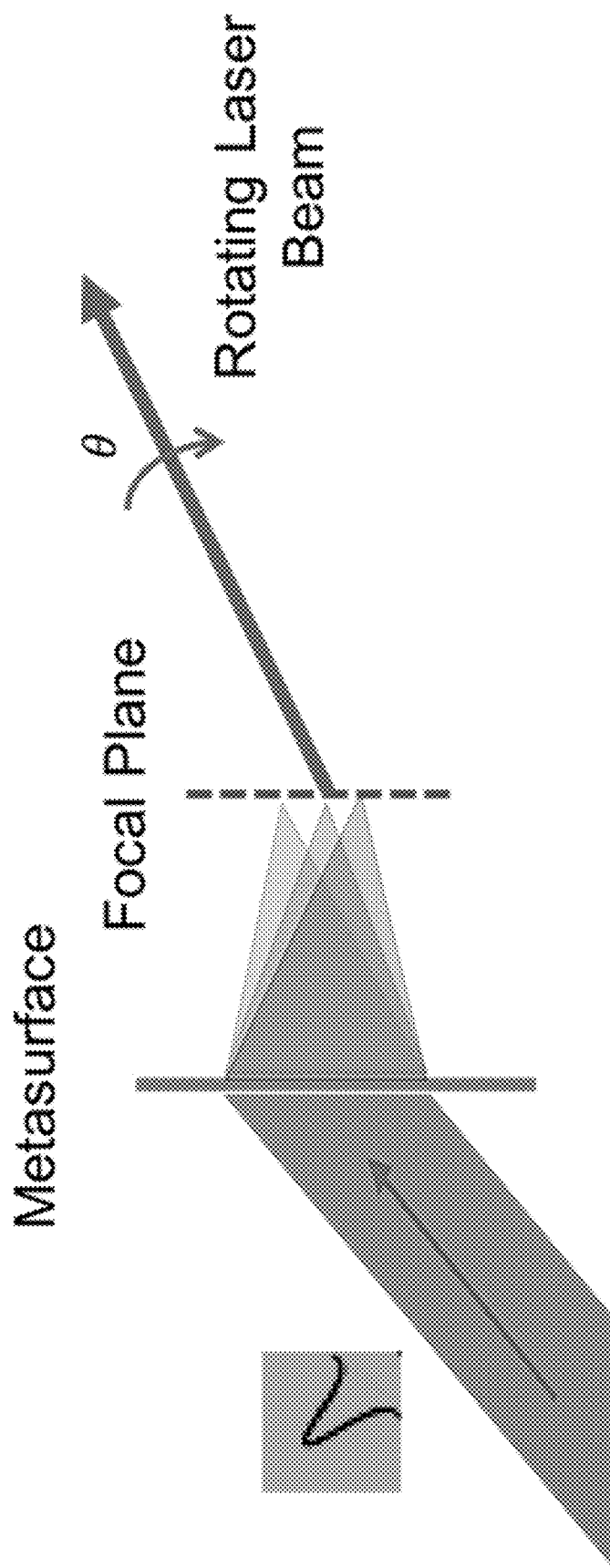

The metasurface presented in FIG. 6A and FIG. 6B can be composed of high index semiconductor, oxides, or metallic building block (nano-particles or nano-slits). These building blocks are in the range of a fraction of the target wavelength (i.e., about $0.01$-$0.5\lambda_0$). These blocks are arranged into dense arrays in which the type, size, orientation, density varies across the spatial location across the metasurface. As a consequence, light passing through the metasurface accumulates different local phase-shift Ø which is spatially varying across the metasurface. It is therefore referred to as phase gradient metasurface.

Figure 7A:
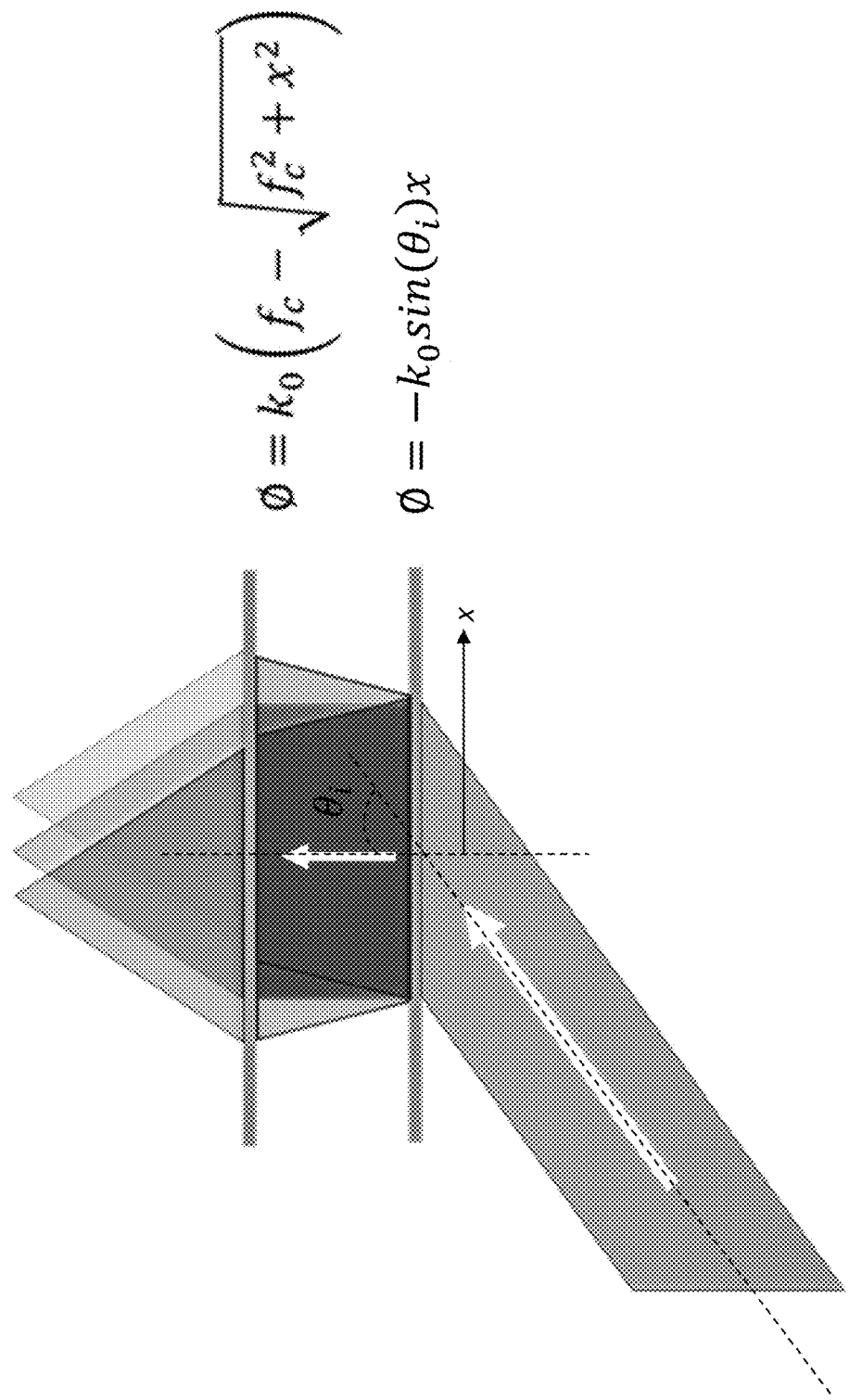
FIGS. 7A and 7B show the optical operation of the metasurface, which combines the function of two metasurfaces (diffraction grating and lens) according to the present disclosure (FIG. 7A) and an implementation using only a single metasurface (FIG. 7B).

The phase gradient metasurface performs the operation of two cascaded optical elements, a diffraction grating and a lens, which would respectively split the different frequencies, and then focus them to an array of foci onto some focal plane. FIG. 7A shows how we can replace the cascaded grating and lens with two separate and cascaded phase gradient metasurfaces, and FIG. 7B demonstrates how the two metasurfaces can be replaced with a single phase gradient metasurface.

As shown in FIG. 7A, the cascaded phase gradient metasurfaces can replace both the grating and the focusing lens. If light is incident towards the bottom metasurface which acts as a grating with an incident angle $\theta_i$, then by designing a phase gradient metasurface with spatial dependent phase response of Ø=$-k_0 \sin(\theta_i)$x, we can bend the light of the center frequency to continue normal to the bottom metasurface (x is the distance along the metasurface). That is the metasurface is configured to allow a normal (perpendicular) processing of the beam for the center frequency of the diffracted beams. The light then leaves the bottom metasurface normally towards the upper metasurface which acts like a lens. By designing the phase response of the second space-gradient metasurface to take the form of Ø=$k_0(f_c-\sqrt{f_c^2+x^2})$, the light beam may be focused at a distance of $f_c$ at a focal plane. Typical value of incident angle $\theta_i$ is about 45°, but in principle it could be any value in the range of about 0° to about 90°. The focal lens $f_c$ is in the range 0.1-10 cm for operation in the visible or near infrared center wavelength operation. The planar size of the metasurfaces is in the order of length of the focal distance $f_c$.

The other spectral components that go through the two metasurfaces will shift slightly from the central frequency components. Other spectral components passing through the bottom metasurface will slightly shift from the normal propagation and will have a tangential wavenumber of $\Delta k \sin(\theta_i)$, and then when pass through the second metasurface will focus with an off-axis shift d given by the equation:

$$\frac{d}{f_c} = \frac{\Delta k \sin(\theta_i)}{k_0} \quad (6)$$

The array of focused frequency lines shown in FIG. 7A acts as the required frequency-arrayed source and generates laser steering in the far-field.

Figure 7B:
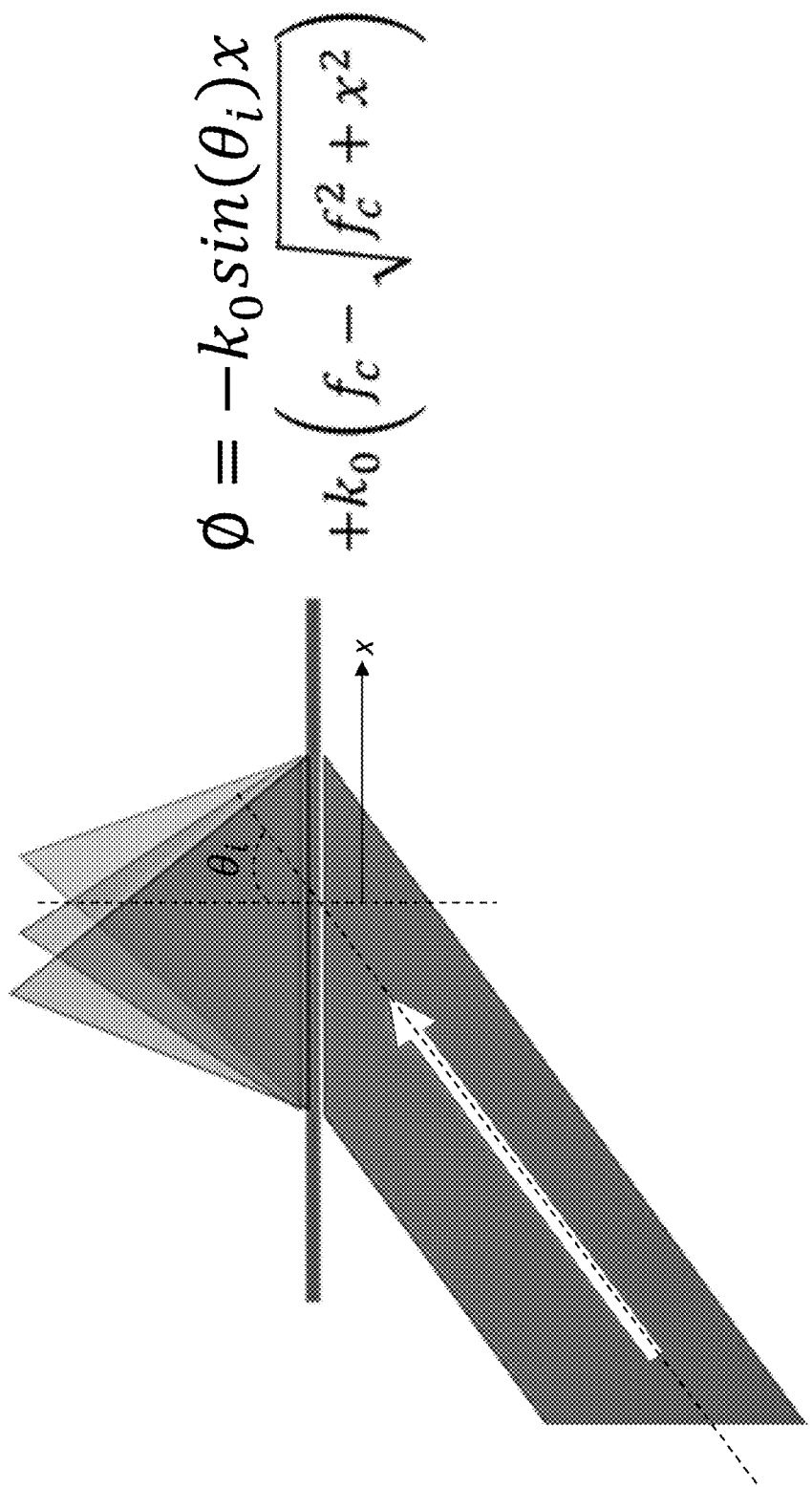

The two metasurfaces can be combined together in one metasurface, as shown in FIG. 7B by combining their phase gradient response into one phase response given by Ø=$-k_0 \sin(\theta_i)x + k_0(f_c-\sqrt{f_c^2+x^2})$. The single metasurface implementation therefore provides the focusing function with the different frequencies into different locations and thus obtains the beam steering in the far-field.

Figure 8A:
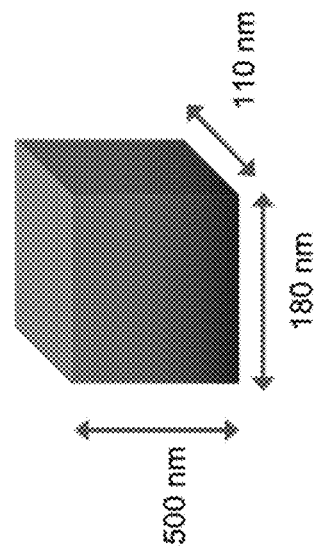
FIGS. 8A and 8B show structural design, according to one embodiment, based on rectangular silicon based nano-antennas, where
Figure 8A:
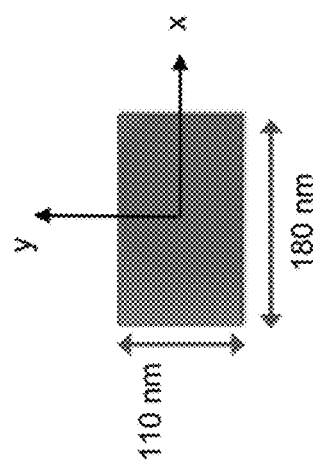
Figure 8A:
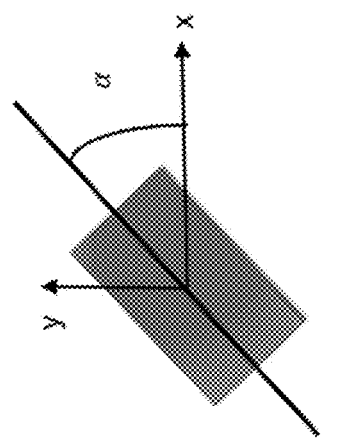
Figure 8B:
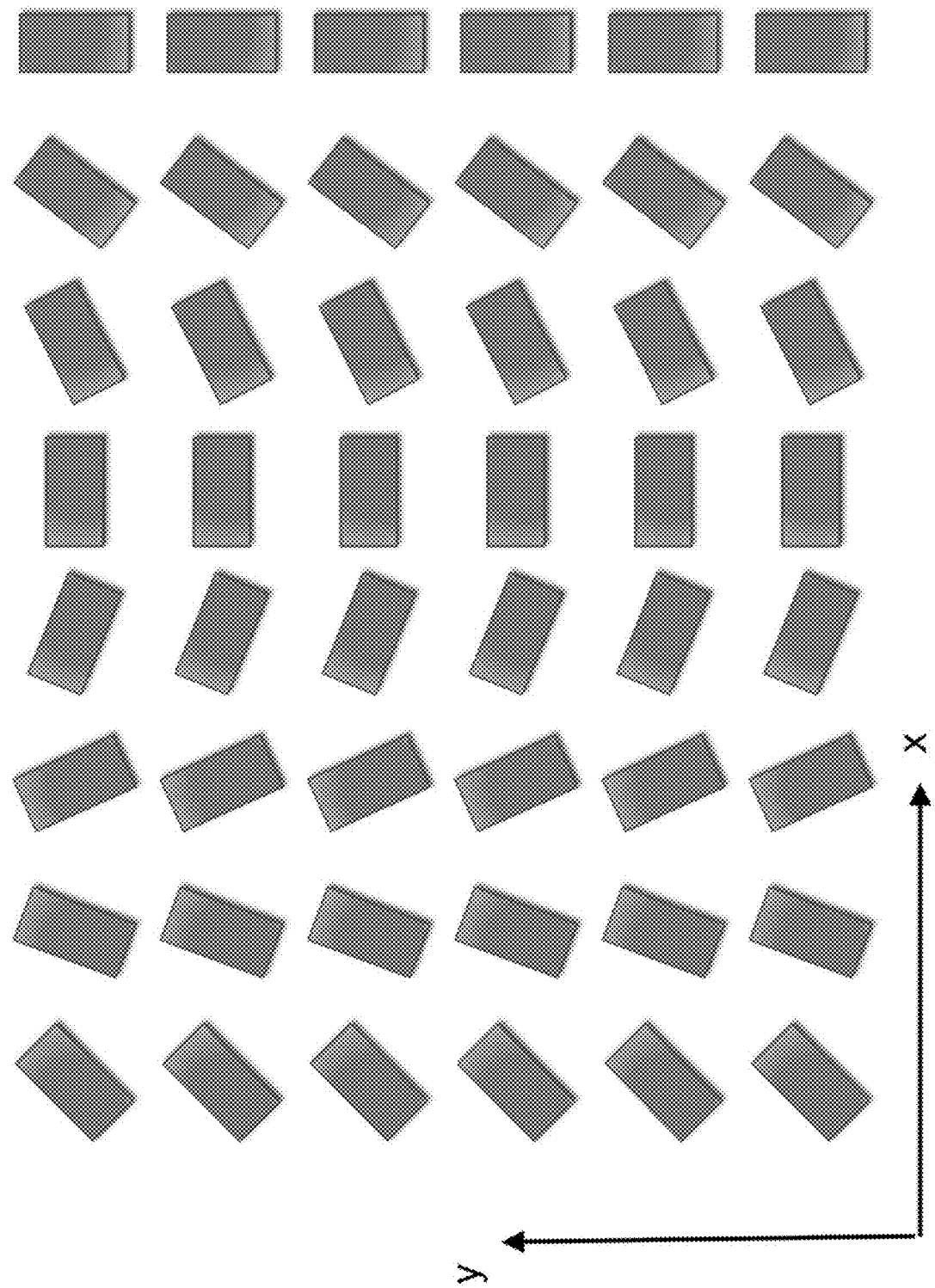

Phase gradient metasurfaces can be implemented, in one embodiment, using silicon nanostructures or nano-antennas shown in FIGS. 8A and 8B. FIG. 8A shows 3D view and top view of a single silicon nano-antenna. The height of the nano-antenna is about 500 nm, and its lateral dimensions are about 180 nm and about 110 nm. These dimensions are designed such that this rectangular silicon nano-antenna works as little half-wave plate for operating center wavelength ($\lambda_0$=800 nm). This means that if circularly polarized light (i.e., left- or right-circularly polarized light, LCP) is applied to this nano-antenna, it changes to the opposite circular polarization (i.e., LCP changes to RCP, and vice versa). In addition, upon rotation of the long axis of the rectangular antenna by an angle $\propto$ as shown in FIG. 8A, circularly polarized light going through the rectangular silicon antenna acquire a phase-shift $\emptyset$=2 $\propto$. Therefore, controlling the orientation of the long axis ($\propto$) between 0 and $\pi$, will enable achieving full range phase pick-up of 0-2$\pi$.

FIG. 8B demonstrates top-view of a metasurface implemented using an array of silicon nano-antennas which controls the phase-shift of light through controlling local orientation of long axis as described above. The center-to-center separation between adjacent silicon nano-antennas is about 400 nm. FIG. 8B shows a portion of the metasurface. The whole structure of the metasurface is on the length scale of 0.5-5 cm incorporating tens of thousands of nano-antennas in each dimension. The orientation of the antenna is defined as a function of x-axis $\propto$ (x), such that the phase shift satisfies the formula $\emptyset(x)=2\propto(x)=-k_0 \sin(\theta_i)x+k_0(f_c-\sqrt{f_c^2+x^2})$, to work as a grating and lens together. The values chosen for this metasurface are a center wavelength $\lambda_0$=800 nm, and the corresponding wavenumber $k_0=2\pi/\lambda_0$, the incident angle of about $\theta_i$=45°, and focal length of about $f_c$=1 cm. According to these selected values, the center wavelength with incident angle of about $\theta_i$=45° will be focused at a focal lens of about $f_c$=1 cm. If another frequency line shifted from the center frequency by, $\Delta f$=20 GHz, then according to equation (6), it will be focused at another location separated from the adjacent frequency line by a separate distance of about d=377 nm. Therefore, an array of different frequency lines will be focused on an array of different locations on some focal plane as demonstrated in FIG. 7B.

Figure 9:
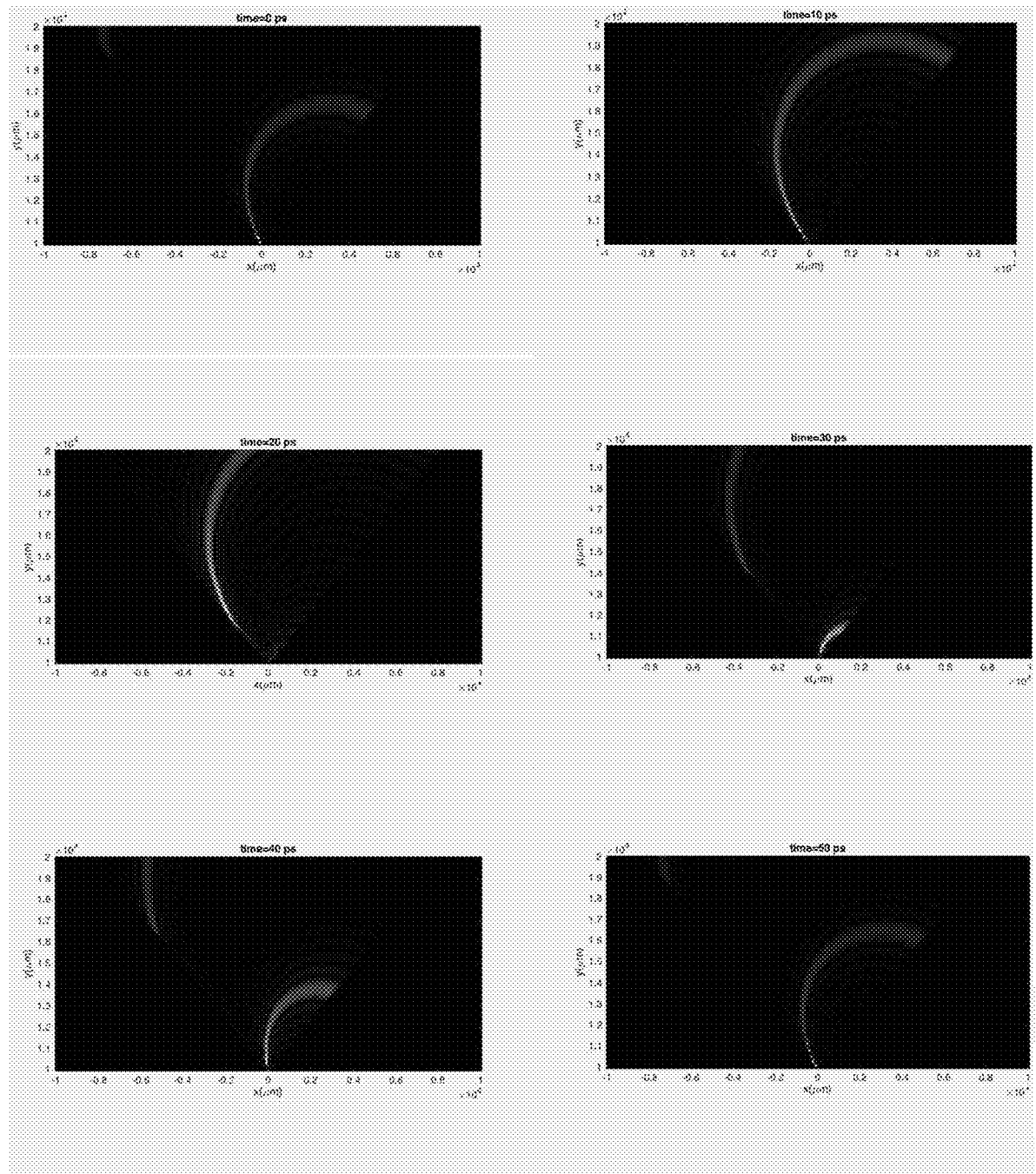
FIG. 9 shows a temporal simulation of generated beam steering from a single metasurface layer.

FIG. 9 shows the temporal simulation of light generated from a frequency-arrayed sources focused from a single metasurface designed as described in FIG. 8A and FIG. 8B, and in the previous sections. The set of numeric values used in the simulation are $f_o$=375 THz ($\lambda_0$=800 nm), $\Delta f$=20 GHz, $f_c$=1 cm, $\theta_i$=45°.

The metasurfaces can be implemented using dielectrics such as silicon, silica, titanium dioxide, alumina, geranium, and other suitable dielectrics known to a person having ordinary skill in the art, or it can be implemented using metals such as gold, silver, aluminum, copper, titanium nitride, zirconium nitride, and other suitable metals known to a person having ordinary skill in the art.

The metasurfaces discussed herein can operate in either reflection or transmission modes.

Figure 10:
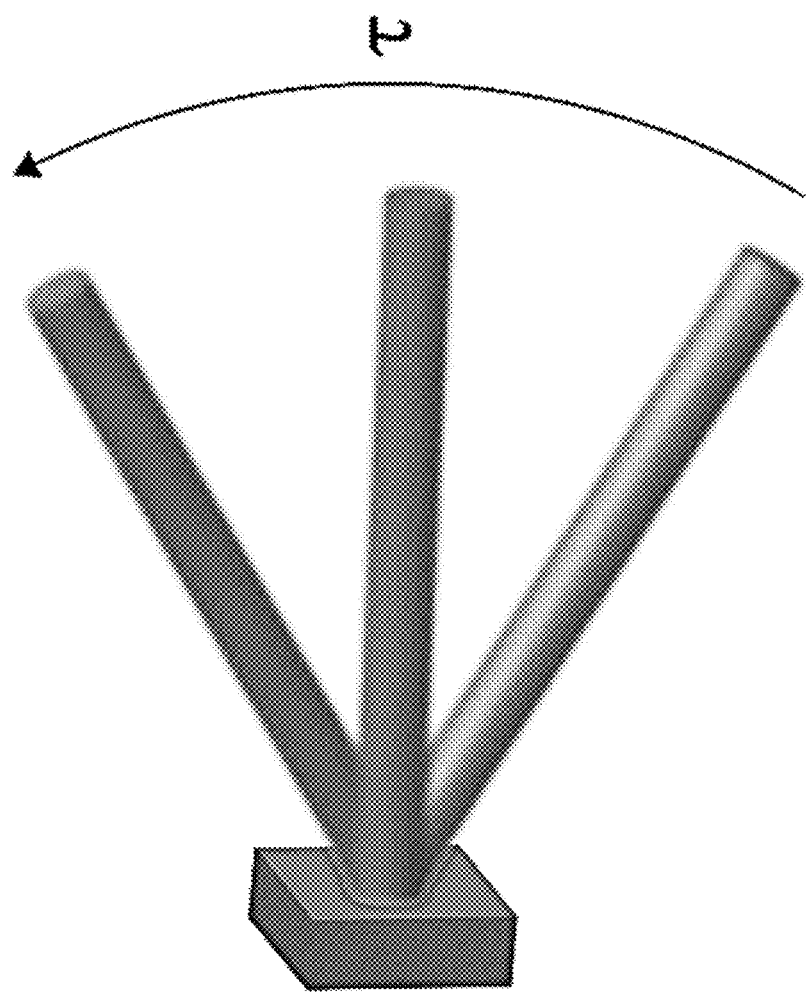
FIG. 10 shows a conceptual schematic of an ultrafast laser beam steering device according to one embodiment. Spectral components of incident ultrashort pulse are redistributed to interfere in space and time together to produce a rotating beam.

FIG. 10 illustrates the conceptual operation of the disclosed apparatus. As shown, it takes an input train of ultrashort pulses produced from an ultrafast laser source. It then redistributes the spectral components of the ultrashort pulses, and lets these components interfere in space and time together to generate laser beam steering.

An ultrafast detector such as a streak camera can be added to the devices to detect back-reflected light, and hence, the device will function as a Lidar system and will reconstruct images of distant objects.

The entire Lidar imaging system can be implemented on-chip. The system includes three components: 1) The frequency-comb ultrafast pulsed laser; 2) The metasurface that combines the (grating+lens) function; 3) Ultrafast detector. The metasurface is a chip-compatible technology as long as it is implemented using chip-compatible fabrication material such as silicon. The frequency-comb source can be implemented on-chip via optical micro-resonators, and the ultrafast detector can be implemented on-chip using a solid-state ultrafast all optical streak camera.

Figure 11:
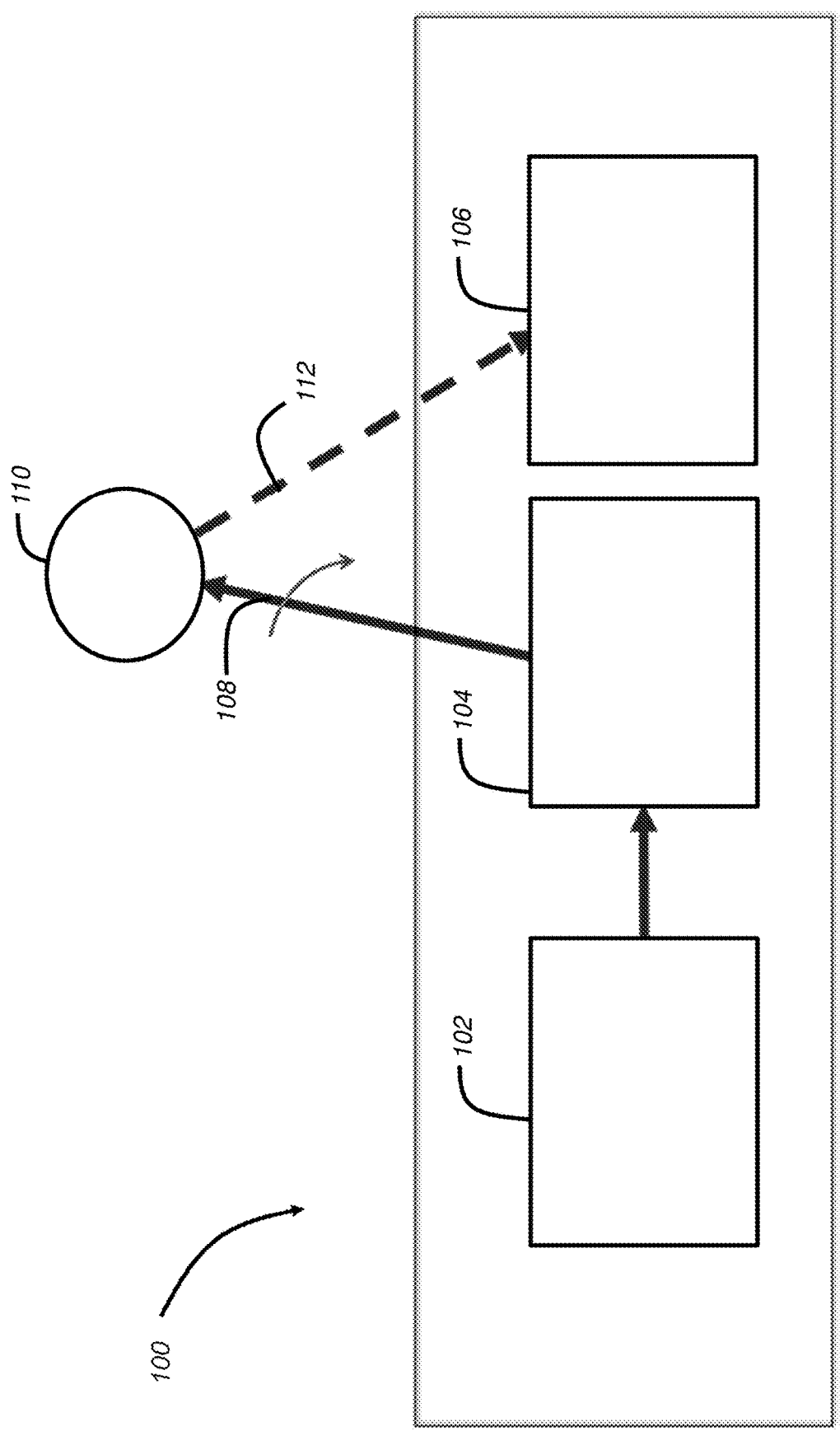
FIG. 11 is a schematic of an on-chip application of the laser steering arrangement, according to the present disclosure, integrated with a detector that can be on-chip to implement a laser steering-detection system.

FIG. 11 demonstrates a schematic of a system 100, according to the present disclosure, implemented on a single chip. The system 100 includes an on-chip frequency comb generator 102 configured to receive a laser beam from a laser source (not shown) and provide a pulsed laser source, an on-chip metasurface arrangement 104 coupled to the comb generator 102 and configured to generate a diffraction grating (diffracted beams based on different frequency lines) and to focus different frequency lines on different locations on a focal plane in order to generate a steered light beam 108, and an on-chip solid-state ultrafast streak camera 106 configured to detect back-reflected light 112 from an object 110.

Those having ordinary skill in the art will recognize that numerous modifications can be made to the specific implementations described above. The implementations should not be limited to the particular limitations described. Other implementations may be possible.

What is claimed is:

1. A laser beam steering system, comprising:
a laser source which produces a pulsed laser light beam with a frequency comb spectrum;
a metasurface configured to i) directly receive the pulsed laser, ii) directly generate a diffracted pulsed laser output at different frequencies with a beam at a center frequency normal to the metasurface; and iii) directly direct the directly generated diffracted pulsed laser output onto different foci at a focal plane,
light propagating from the focal plane leads to generation of one or more optical beams that are controlled in space and time.

2. The system according to claim 1, further comprising a detector that receives back reflected light from an object on which the propagated light is incident and thereby configured to build an image of the object.

3. The system according to claim 2, wherein the metasurface comprises a metal selected from the group consisting essentially of gold, silver, copper, aluminum, titanium nitride, and zirconium nitride.

4. The system according to claim 2, wherein where the metasurface comprises a dielectric selected from the group consisting essentially of silicon, germanium, alumina, silica, titanium dioxide, and gallium arsenide.

5. The system according to claim 2, wherein where the metasurface comprises an oxide material selected from the group consisting essentially of indium titanium oxide, and aluminum doped zinc oxide.

6. The system in claim 2, wherein the system forms a LIDAR system.

7. The system in claim 6, wherein the detector comprises a streak camera.

8. The system in claim 6, wherein the detector comprises an on-chip solid-state ultrafast streak camera.

9. The system in claim 1, wherein the laser source comprises an on-chip micro-ring frequency-comb generator.

10. The system in claim 6, wherein the metasurface, and the detector are constructed on a single chip.

* * * * *